Patented Dec. 19, 1933

1,940,494

UNITED STATES PATENT OFFICE 1,940,494

PROCESS OF PRODUCING PHENOLPHTHALEIN

Max H. Hubacher, Nitro, W. Va., assignor to Kavalco Products, Inc., Nitro, W. Va., a corporation of West Virginia No Drawing. Application August 7, 1930
Serial No. 473,765

13 Claims. (Cl. 260—65)

The present invention relates to improvements in processes of manufacturing phenolphthalein and has for its objects simplicity and economy in procedure and a high grade of purity of product.

The well known reaction of phthalic anhydride with phenol in the presence of a dehydrating and catalytic agent as commonly used in the production of phenolphthalein, results in the delivery of crude phenolphthalein with accompanying formation of water. Various chemicals have been heretofore proposed as dehydrating and catalytic agents, such as concentrated sulphuric acid, anhydrous zinc chloride, anhydrous tin chloride, anhydrous aromatic sulphonic acids, and others; but regardless of the agent or agents used, the reaction of condensation is never complete, with the result that the amounts of phenolphthalein in the crude material vary considerably. Other reactions take place resulting in the formation of varying amounts of tarry or resinous by-products and colored by-products, which cause a loss in the applied ingredients, greatly interfere with the subsequent refining or purification of the crude phenolphthalein and considerably lower the yield of the refined or purified final product. There are also formed greater or less amounts of other by-products, such as fluorane, which also cause a loss in the applied ingredients and a corresponding lowered yield of the refined or purified final product.

Heretofore processes for manufacturing phenolphthalein possessing a high grade of purity, have aimed to free the product of impurities after the reaction of phthalic anhydride with phenol has taken place. A method commonly used for such purification has been to dissolve the crude phenolphthalein, after it has been washed with water, in a caustic soda solution, filter the solution to remove fluorane and subsequently precipitate the phenolphthalein by an acid. The resulting material is dried, and then further treated to free it of tarry and colored substances by dissolving it in alcohol or other solvent, using a decolorizing carbon in the solution, and boiling and filtering the solution, concentrating it and then crystallizing out the phenolphthalein by cooling. The phenolphthalein obtained from this crystallization is then recrystallized, and this is repeated as often as is necessary, and usually many times, to produce a product of the required purity, so that increased labor, loss of time and loss of material are caused by the large number of purifications necessary to produce an acceptable product.

The present invention aims to produce at the initial state of the process, i. e., while the reaction of phthalic anhydride with phenol is taking place, a material containing a maximum amount of phenolphthalein and a minimum amount of by-products. A higher yield of the final purified product is obtained. Also, the period of condensation is shortened and fewer crystallizations are required to produce the final product, and the process as a whole is facilitated and simplified.

In accordance with the present invention, the condensation of phthalic anhydride with phenol, with resulting increased yield of phenolphthalein, is carried out in the presence of certain combinations of substances, such as zinc chloride and a relatively small amount of an inorganic acidifying substance, such as concentrated sulphuric acid. The use of concentrated sulphuric acid as a condensing agent in the preparation of phenolphthalein, is well known, but the amounts of sulphuric acid heretofore used have been comparatively large, and it is a recognized fact that sulphuric acid, as used in prior processes, is particularly disadvantageous in that considerable colored and tarry by-products are formed in the reaction. The herein described combinations of substances assisting the condensation of phthalic anhydride and phenol are characterized by the very small amount of sulphuric acid or the comparatively small amounts of other substances used relatively to the other ingredients. It has been discovered that the inorganic acidifying substance, when used in such relatively small amount and in combination with a principal condensing agent, such as zinc chloride, although tending to some extent to form colored and tarry bodies in the reaction, acts to considerably reduce the period of time in which the condensation takes place and to enable the condensation to be carried on at a comparatively low temperature and to cause the condensation to proceed to more successful completion, with the result that the impurities in the product resulting from the condensation are considerably decreased. Thus greater yields of purified phenolphthalein with fewer purifying crystallizing operations are obtainable.

Although sulphuric acid is the preferred inorganic acidifying substance to be combined with the principal condensing agent, good yields of phenolphthalein may also be obtained by the use of such substances as phosphorous oxychloride, phosphorous trichloride, phosphorus pentachloride. In the reaction of phthalic anhydride with phenol in the presence of a chloride condensing agent, such as anhydrous zinc chloride, a relatively small amount of any one of the aforesaid chlorides of phosphorus acts to accelerate the reaction of condensation.

It has also been found that excellent results may be obtained by passing dry hydrochloric acid gas, as the acidifying substance, through the charge during a condensation operation wherein a principal condensing agent, such as anhydrous zinc chloride, is being used.

Another important feature of the invention is the addition of a suitable quantity of a decolorizing carbon to the charge during the condensation operation, whereby, it has also been discovered, the proportion of colored and tarry bodies in the product of the condensation operation is still further reduced, and still fewer subsequent crystallizations from solution are necessary to yield the final purified product. It is possible that the decolorizing carbon absorbs these by-products or acts to restrict their formation. The added carbon may be removed from the product when subsequently processing the product to free it of fluorane bodies.

A preferred process for producing crude phenolphthalein in accordance with the invention consists in using anhydrous zinc chloride and a relatively small quantity of concentrated sulphuric acid to bring about the condensation of phthalic anhydride and phenol, and in incorporating with the charge a small quantity of a decolorizing carbon.

In using this preferred process, the following proportions have been found highly satisfactory, namely, 296 grams of phthalic anhydride, 376 grams of phenol, 200 grams of anhydrous zinc chloride, 20 grams of decolorizing carbon, and 10 grams of concentrated sulphuric acid (66° Bé.). The ingredients were charged into a vessel and maintained heated therein at about 120° C., with agitation, for 36 hours. The yield was found to be 656 grams of crude phenolphthalein, including carbon and by-products, which when purified gave 579 grams of phenolphthalein free of fluorane. This is equivalent to about 91% of the theoretical yield. On a larger scale the proportions are substantially as above set forth. The ingredients are charged into a jacketed glass-enameled kettle and heated therein by means of steam at about 120° C., with agitation, for 36 hours.

The charge, without the sulphuric acid content therein, has to be heated for a period of 48 hours or longer, this being given as an indication of the considerably reduced period of time in which the condensation takes place in accordance with this invention. By increasing the sulphuric acid in the charge to 20 grams instead of 10 grams, in the small scale example above given, it was found that the period required to effect condensation was shortened to from 12 to 16 hours instead of 36 hours.

Another condensation procedure which has been found to produce excellent yields, consists in passing dry hydrochloric acid gas through a charge consisting of 296 grams of phthalic anhydride, 376 grams of phenol and 200 grams of anhydrous zinc chloride. Very satisfactory yields have also been obtained by a procedure wherein, in place of passing of dry hydrochloric acid through the charge above stated, which may be said to be the standard charge, either one of the following substances have been added to this standard charge, to wit, phosphorus oxychloride, phosphorus trichloride or phosphorus pentachloride, each in the amount of 20 grams.

A preferred temperature for effecting condensation is 120° C., but good results are obtainable from 115° C. to 135° C. The proper period for effecting condensation varies in accordance with the quantity and kind of acidifying substance used, but in most cases it is between 9 and 21 hours, a period of 12 to 14 hours being the most common. A period of over 21 hours has a tendency to increase the amount of tarry by-products.

The charge has a tendency to become very thick or viscous when nearing the end of the reaction, which makes stirring and subsequent handling of the condensate more difficult. This stiffening of the condensate may be counteracted or eliminated by adding to the charge a suitable quantity of a liquefying agent. For this purpose, chlorbenzene, tetrachlorethane or a petroleum oil have been found to produce satisfactory results, any one of these liquefying agents being added to the charge in quantities varying between 50 and 100 grams in the small scale charge above stated. When the condensation is finished, the liquefying agent may be removed from the condensate by steam distillation or extraction by means of a solvent such as petroleum ether in which phenolphthalein is not appreciably soluble.

A preferred method of purifying the crude phenolphthalein, obtained as outlined above, is the following: The crude phenolphthalein is made into a thick slurry by adding hot water. In this form it is run into a tub where it is washed repeatedly with boiling water until phenol, phthalic acid, zinc chloride and certain water soluble impurities are removed. The washed phenolphthalein is then added to a soda ash solution, in the proportion of 100 grams of crude phenolphthalein (calculated to a dry basis) to 40 grams of sodium carbonate per litre of water. The soda ash solution and the crude phenolphthalein therein are vigorously boiled for a period of about 24 hours, by which time there is obtained a complete solution of the phenolphthalein. The solution, red in color, is then filtered, and the filter cake washed. This filter cake contains substantially all of the carbon which was previously added to the condensation charge, and substantially all of the relatively small amounts of fluorane bodies which were produced as by-products during the reaction of condensation. The filtrate is diluted to contain 40 to 50 grams of phenolphthalein per litre of water. This diluted solution is cooled to 25° to 30° C., and is then run into such amount of a 20% sulphuric acid solution as to effect precipitation of the phenolphthalein. The precipitated material is filtered, washed thoroughly and dried. The dried material is dissolved in ethyl alcohol, decolorized by means of a decolorizing carbon, filtered and crystallized from the alcohol solution. Crystallization is repeated until the requirements of the United States Pharmacopœia for phenolphthalein are met; i. e., until United States Pharmacopœia material is secured.

The process herein described makes possible very high yields of pure phenolphthalein in a comparatively short time. In general, not over three crystallizations from alcohol are required to produce a product substantially white in color, free of fluorane and resinous by-products and having a melting point of from 260° to 261° C.

What is claimed is:

1. In a process for producing phenolphthalein, the step of condensing phthalic anhydride with phenol in the presence of zinc chloride and a relatively small amount of sulphuric acid.

2. In a process for producing phenolphthalein, the step of condensing phthalic anhydride with phenol in the presence of a relatively small amount of a dehydrating inorganic acidifying substance, zinc chloride, and a decolorizing carbon.

3. In a process for producing phenolphthalein, the step of condensing phthalic anhydride with phenol in the presence of zinc chloride and a relatively small amount of hydrochloric acid.

4. In a process for producing phenolphthalein, the step of condensing phthalic anhydride with phenol in the presence of zinc chloride and a chloride of phosphorus.

5. In a process for producing phenolphthalein, the step of condensing phthalic anhydride with phenol in the presence of a condensing agent and a chloride of phosphorus.

6. In a process for producing phenolphthalein, the step of condensing phthalic anhydride with phenol in the presence of a chloride condensing agent and a chloride of phosphorus.

7. In a process for producing phenolphthalein, the step of condensing phthalic anhydride with phenol in the presence of a chloride condensing agent and a relatively small amount of hydrochloric acid gas passed through the charge.

8. In the step of condensing phthalic anhydride and phenol in the presence of a condensing agent for the production of phenolphthalein, passing hydrochloric acid gas in relatively small amounts through the charge.

9. In a process for producing phenolphthalein the step of condensing phthalic anhydride with phenol in the presence of zinc chloride, a dehydrating inorganic acidifying substance, and a decolorizing carbon, the zinc chloride being present in a greater proportion than the acidifying substance.

10. A process for producing phenolphthalein, which comprises, condensing about 296 parts by weight of phthalic anhydride with about 376 parts by weight of phenol in the presence of about 200 parts by weight of zinc chloride, about 20 parts by weight of decolorizing carbon and about 20 parts by weight of concentrated sulphuric acid.

11. A process for producing phenolphthalein, which comprises, condensing about 296 parts by weight of phthalic anhydride with about 376 parts by weight of phenol in the presence of about 200 parts by weight of zinc chloride, about 20 parts by weight of decolorizing carbon and about 10 parts by weight of concentrated sulphuric acid.

12. In a process for producing phenolphthalein, the step of condensing phthalic anhydride with phenol in the presence of zinc chloride and a relatively small amount of sulphuric acid, the proportion of zinc chloride being about ten times the proportion of sulphuric acid.

13. A process for producing phenolphthalein, which comprises, condensing phthalic anhydride with phenol in the presence of zinc chloride, a relatively small amount of sulphuric acid, and a decolorizing carbon.

MAX H. HUBACHER.